US012294872B2

(12) United States Patent
Sun et al.

(10) Patent No.: US 12,294,872 B2
(45) Date of Patent: May 6, 2025

(54) WIRELESS ACCESS POINT GROUP-BASED CALIBRATION METHOD AND DEVICE, AND COMPUTER STORAGE MEDIUM

(71) Applicant: HUAWEI TECHNOLOGIES CO., LTD., Guangdong (CN)

(72) Inventors: Fuqing Sun, Shenzhen (CN); Dewei Bao, Nanjing (CN); Xiaofei Bai, Suzhou (CN); Juzheng Yu, Suzhou (CN); Qikun Wei, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 339 days.

(21) Appl. No.: 17/696,292

(22) Filed: Mar. 16, 2022

(65) Prior Publication Data
US 2022/0256363 A1   Aug. 11, 2022

Related U.S. Application Data

(63) Continuation of application No. PCT/CN2020/115733, filed on Sep. 17, 2020.

(30) Foreign Application Priority Data

Sep. 17, 2019  (CN) .......................... 201910878314.4

(51) Int. Cl.
*H04W 24/02* (2009.01)
*H04W 28/02* (2009.01)
*H04W 88/08* (2009.01)

(52) U.S. Cl.
CPC ....... *H04W 24/02* (2013.01); *H04W 28/0236* (2013.01); *H04W 88/08* (2013.01)

(58) Field of Classification Search
CPC . H04W 24/02; H04W 28/0236; H04W 88/08; H04W 28/0933; H04W 40/32;
(Continued)

(56) References Cited

U.S. PATENT DOCUMENTS

2014/0036787 A1   2/2014  Ganu et al.
2014/0038625 A1   2/2014  Palanivelu et al.
(Continued)

FOREIGN PATENT DOCUMENTS

CN   102761882 A   10/2012
CN   105940703 A   9/2016
(Continued)

OTHER PUBLICATIONS

Cisco, Radio Resource Management White Paper, Jan. 26, 2018, 52 pages, XP055953560.

*Primary Examiner* — Ricky Q Ngo
*Assistant Examiner* — Kabir U Jahangir
(74) *Attorney, Agent, or Firm* — WOMBLE BOND DICKINSON (US) LLP

(57) ABSTRACT

Embodiments of this application disclose a group-based calibration method and device. The method includes: A control device that obtains path loss data of a wireless access point AP set, where the AP set includes a plurality of APs, and the path loss data includes a path loss between any two of the plurality of APs. The control device obtains a first calibration group based on the path loss data, and sends first calibration information to a management AP of the first calibration group, where the management AP of the first calibration group is an AP that performs calibration management in the first calibration group. By implementing the foregoing method, the control device may divide a plurality of APs into a plurality of calibration groups based on path loss data between the APs, to decrease a coupling degree between the calibration groups.

18 Claims, 7 Drawing Sheets

(58) Field of Classification Search
CPC ..... H04W 84/12; H04W 16/02; H04W 16/08; H04W 88/12; H04W 16/18; H04W 72/0453; H04W 72/0473; H04W 72/541; H04W 72/542; H04L 12/4641
See application file for complete search history.

(56) References Cited

U.S. PATENT DOCUMENTS

| | | | |
|---|---|---|---|
| 2015/0045054 A1* | 2/2015 | Emadzadeh | G01S 5/0242 455/456.1 |
| 2015/0223143 A1 | 8/2015 | Celebi et al. | |
| 2015/0304886 A1 | 10/2015 | Liu et al. | |
| 2015/0341939 A1 | 11/2015 | Sharma et al. | |
| 2016/0119881 A1 | 4/2016 | Merlin et al. | |
| 2019/0068289 A1* | 2/2019 | Anderson | H04B 10/07955 |
| 2019/0373569 A1* | 12/2019 | Ram | H04W 56/005 |
| 2019/0394653 A1* | 12/2019 | Abeysekera | H04W 28/24 |
| 2020/0177287 A1* | 6/2020 | Yu | H04B 7/0617 |

FOREIGN PATENT DOCUMENTS

| | | |
|---|---|---|
| CN | 107836131 A | 3/2018 |
| CN | 109068375 A | 12/2018 |

\* cited by examiner

| | AP 1 | AP 2 | ... | AP n-1 | AP n |
|---|---|---|---|---|---|
| AP 1 | 0 | 60 | | 82 | 90 |
| AP 2 | 60 | 0 | | 75 | 88 |
| ... | | | | | |
| AP n-1 | 82 | 75 | | 0 | 71 |
| AP n | 90 | 88 | | 71 | 0 |

| AP | Sampling moment | Transmission rate | Quantity of associated users | Channel utilization |
|---|---|---|---|---|
| AP 1 | 8:00:01 | 8 Mbps | 10 | 52% |
| AP 1 | 8:01:01 | 5 Mbps | 6 | 25% |
| ... | | | | |
| AP 1 | 8:30:01 | 6 Mbps | 8 | 34% |

FIG. 5

| Calibration group | Management AP | Size of the calibration group | Calibration group members | Calibration order |
|---|---|---|---|---|
| First calibration group | AP 1 | 4 | AP 1, AP 2, AP 5, and AP 8 | 3 |
| Second calibration group | AP 3 | 4 | AP 3, AP 4, AP 9, and AP 10 | 1 |
| Third calibration group | AP 6 | 2 | AP 6 and AP 7 | 2 |

FIG. 6

WIRELESS ACCESS POINT GROUP-BASED CALIBRATION METHOD AND DEVICE, AND COMPUTER STORAGE MEDIUM

CROSS-REFERENCE TO RELATED APPLICATIONS

This application is a continuation of International Application No. PCT/CN2020/115733, filed on Sep. 17, 2020, which claims priority to Chinese Patent Application No. 201910878314.4, filed on Sep. 17, 2019. The disclosures of the aforementioned applications are hereby incorporated by reference in their entireties.

TECHNICAL FIELD

This application relates to the field of communications technologies, and in particular, to a wireless access point group-based calibration method and device, and a computer storage medium.

BACKGROUND

A wireless access point (AP) is an access point of a wireless network and is usually referred to as a "hotspot". A wireless access point serves to convert a wired network into a wireless network, and is mainly applied to an area that requires wireless coverage, for example, an office building, a campus, or a factory, so that a wireless device accesses the wireless network through the AP.

If a local radio resource management (RRM) solution is used in a radio resource scheduling and allocation process, due to a lack of a local wireless local area network access controller (WLAN AC), APs in a particular area range are usually divided into a plurality of calibration groups by using a random grouping or manually planned grouping method, and a leader AP is elected for each calibration group. Each leader AP manages only APs in a calibration group in which the leader AP is located, and is responsible for channel allocation, power calibration, load balancing, and the like for the calibration group in which the leader AP is located. However, the method of dividing calibration groups through random grouping or manually planned grouping results in a relatively large coupling degree between the calibration groups. Consequently, interference between the calibration groups is relatively large, affecting a calibration effect.

SUMMARY

Embodiments of this application disclose a group-based calibration method and device. A control device divides a plurality of APs into a plurality of calibration groups based on path loss data between the APs. This can decrease a coupling degree between the calibration groups. In addition, an AP with light load is selected as a management AP for each calibration group, thereby increasing a calibration convergence speed.

According to a first aspect, an embodiment of this application provides a wireless AP group-based calibration method, including:

A control device that obtains path loss data of a wireless AP set. The AP set includes a plurality of APs, and the path loss data includes a path loss between any two of the plurality of APs.

The control device obtains a first calibration group based on the path loss data, where the first calibration group includes a first AP and a second AP of the plurality of APs. The control device divides the AP set into a plurality of calibration groups by using a preset algorithm based on the path loss data and the AP set, where the first calibration group is any one of the plurality of calibration groups.

The control device sends first calibration information to a management AP of the first calibration group. The first calibration information includes an identifier of the first AP and an identifier of the second AP, and the management AP of the first calibration group is an AP that performs calibration management in the first calibration group.

Each AP in the AP set obtains path loss data between the AP and another AP in the AP set, and sends the obtained path loss data to the control device that manages the plurality of APs in the AP set in a centralized manner. The control device groups the plurality of APs in the AP set based on the path loss data, so that two APs with a large path loss between each other can be allocated to different calibration groups. In this way, APs in different calibration groups are invisible to each other, thereby decreasing a coupling degree between different calibration groups and improving a calibration effect for a WLAN network.

In one embodiment, before the control device sends the first calibration information to the management AP of the first calibration group, the method further includes:

The control device obtains load information of the first AP and load information of the second AP. The load information of the first AP includes load data of the first AP collected at a first sampling moment and load data of the first AP collected at a second sampling moment, the load information of the second AP includes load data of the second AP collected at the first sampling moment and load data of the second AP collected at the second sampling moment, and the load data includes at least one of a transmission rate, channel utilization, and a quantity of associated users.

The control device obtains a first load value based on a preset first algorithm, the load data of the first AP collected at the first sampling moment, and the load data of the first AP collected at the second sampling moment; and obtains a second load value based on the preset first algorithm, the load data of the second AP collected at the first sampling moment, and the load data of the second AP collected at the second sampling moment. The first load value and the second load value are predicted load values of the first AP and the second AP for a next sampling moment.

The control device determines an AP with a smaller load value from the first AP and the second AP as the management AP of the first calibration group based on the first load value and the second load value.

APs in each calibration group periodically obtain their respective load information such as quantities of associated users, channel utilization, and transmission rates, and send the obtained load information to the control device. The control device determines load of each AP in a next calibration period based on a preset prediction algorithm in combination with historical load information of each AP, and selects an AP with lightest load as a leader AP of the calibration group in the next calibration period. In this way, the leader AP has a light service load, and therefore has sufficient resources to bear a calibration task of the calibration group.

In one embodiment, the method further includes:

The control device obtains a second calibration group and a third calibration group based on the path loss data and the AP set. The second calibration group includes a third AP and a fourth AP of the plurality of APs, and the third calibration group includes a fifth AP and a sixth AP of the plurality of APs.

The control device sends second calibration information to a management AP of the second calibration group and third calibration information to a management AP of the third calibration group. The second calibration information includes an identifier of the third AP and an identifier of the fourth AP, the management AP of the second calibration group is an AP that performs calibration management in the second calibration group, the third calibration information includes an identifier of the fifth AP and an identifier of the sixth AP, and the management AP of the third calibration group is an AP that performs calibration management in the third calibration group.

The control device calculates a first coupling value, a second coupling value, and a third coupling value based on the first calibration group, the second calibration group, and the third calibration group. The first coupling value is a sum of a coupling degree between the first calibration group and the second calibration group and a coupling degree between the first calibration group and the third calibration group, the second coupling value is a sum of a coupling degree between the second calibration group and the first calibration group and a coupling degree between the second calibration group and the third calibration group, and the third coupling value is a sum of a coupling degree between the third calibration group and the first calibration group and a coupling degree between the third calibration group and the second calibration group.

The control device obtains a calibration sequence based on the first coupling value, the second coupling value, and the third coupling value. The calibration sequence is used to represent a sequence of calibrating the first calibration group, the second calibration group, and the third calibration group.

In one embodiment, the first calibration information further includes the calibration sequence, information about the management AP of the second calibration group, and information about the management AP of the third calibration group.

The control device calculates coupling degrees between each calibration group and other calibration groups, and formulates a calibration sequence of the calibration groups based on the coupling degrees. In this way, during calibration, a calibration group may obtain a calibration result of a calibration group that has been calibrated, so that channel allocation is performed based on the calibration result of the calibration group that has been calibrated. This can avoid a problem, during simultaneous calibration of a plurality of calibration groups, that a large coupling degree between the calibration groups is caused after the calibration because the calibration groups do not interact with each other.

In one embodiment, that the control device obtains path loss data of an AP set includes:

The control device obtains first path loss data, where the first path loss data is a path loss value between the first AP and the second AP that falls within a preset range and that is obtained at a third sampling moment;

the control device obtains second path loss data. The second path loss data is a path loss value between the first AP and the second AP that falls within the preset range and that is obtained at a fourth sampling moment; and the control device obtains path loss data between the first AP and the second AP based on the first path loss data and the second path loss data.

A preset interval is set for a path loss value corresponding to each AP pair. When receiving path loss data sent by an AP, the control device determines, by querying the preset interval corresponding to the path loss value of each AP pair, whether a received path loss value corresponding to an AP pair is a valid value. If the path loss value falls within the preset interval, the path loss value is kept and used as path loss data of the corresponding AP pair. This prevents a calibration group grouping result from being affected by a sudden change of a path loss value caused because an environment in which the APs are located undergoes a change or the like.

In one embodiment, that the control device obtains path loss data between the first AP and the second AP based on the first path loss data and the second path loss data includes:

The control device uses an average value of the first path loss data and the second path loss data as the path loss data between the first AP and the second AP; or the control device obtains the path loss data between the first AP and the second AP based on the first path loss data, the second path loss data, and a weighted averaging algorithm.

The control device obtains path loss data between each AP pair at a plurality of sampling moments, calculates an average value of the path loss data of each AP pair at the plurality of sampling moments, and then divides the APs into calibration groups based on the average value of the path loss data of each AP pair. In this way, a division result is more accurate.

In one embodiment, the control device receives a calibration request sent by the management AP of the first calibration group. The calibration request includes an identifier of the management AP of the first calibration group and an identifier of an AP included in the first calibration group.

The control device obtains, based on the calibration request, path loss data of an AP set included in the first calibration group.

The control device obtains a fourth calibration group based on the path loss data of the AP set included in the first calibration group. An AP set included in the fourth calibration group is a subset of the AP set included in the first calibration group.

The control device sends fourth calibration information to a management AP of the fourth calibration group. The fourth calibration information includes an identifier of an AP included in the fourth calibration group, and the management AP of the fourth calibration group is an AP that performs calibration management in the fourth calibration group.

A management AP of a calibration group may periodically send a calibration request to the control device. The control device periodically groups APs in the AP set based on newly received path loss data. In this way, groups can be updated in a timely manner when a new AP is added to the AP set or an AP is closed.

In one embodiment, a quantity of APs in the first calibration group is less than or equal to a preset threshold, the preset threshold is a quantity of APs that a target AP can manage, and the target AP is an AP that manages a minimum quantity of APs in the AP set.

Quantities of APs that the APs in the AP set can manage may be different. When dividing the APs into calibration groups, the control device needs to limit a quantity of APs in each calibration group. Therefore, the control device needs to obtain a quantity of APs that each AP in the AP set can manage, and uses a minimum value thereof as a constraint condition of the preset AI algorithm. In this way, a quantity of APs in each calibration group obtained through division is less than or equal to the minimum value. This prevents an actual quantity of APs in a calibration group from exceeding a quantity of APs that a management AP of the calibration group can manage.

According to a second aspect, an embodiment of this application provides a group-based calibration apparatus, including:
- a communications unit, configured to obtain path loss data of a wireless access point AP set, where the AP set includes a plurality of APs, and the path loss data includes a path loss between any two of the plurality of APs; and
- a processing unit, configured to obtain a first calibration group based on the path loss data, where the first calibration group includes a first AP and a second AP of the plurality of APs, where, the communications unit is further configured to send first calibration information to a management AP of the first calibration group, where the first calibration information includes an identifier of the first AP and an identifier of the second AP, and the management AP of the first calibration group is an AP that performs calibration management in the first calibration group.

In one embodiment, the communications unit is further configured to obtain load information of the first AP and load information of the second AP, where the load information of the first AP includes load data of the first AP collected at a first sampling moment and load data of the first AP collected at a second sampling moment, the load information of the second AP includes load data of the second AP collected at the first sampling moment and load data of the second AP collected at the second sampling moment, and the load data includes at least one of a transmission rate, channel utilization, and a quantity of associated users; and
  the processing unit is further configured to: obtain a first load value based on a preset first algorithm, the load data of the first AP collected at the first sampling moment, and the load data of the first AP collected at the second sampling moment;
  obtain a second load value based on the preset first algorithm, the load data of the second AP collected at the first sampling moment, and the load data of the second AP collected at the second sampling moment; and
  determine the management AP of the first calibration group from the first AP and the second AP based on the first load value and the second load value.

In one embodiment, the processing unit is further configured to obtain a second calibration group and a third calibration group based on the path loss data and the AP set, where the second calibration group includes a third AP and a fourth AP of the plurality of APs, and the third calibration group includes a fifth AP and a sixth AP of the plurality of APs; and
  the communications unit is further configured to send second calibration information to a management AP of the second calibration group and third calibration information to a management AP of the third calibration group, where the second calibration information includes an identifier of the third AP and an identifier of the fourth AP, the management AP of the second calibration group is an AP that performs calibration management in the second calibration group, the third calibration information includes an identifier of the fifth AP and an identifier of the sixth AP, and the management AP of the third calibration group is an AP that performs calibration management in the third calibration group.

In one embodiment, the processing unit is further configured to: calculate a first coupling value, a second coupling value, and a third coupling value based on the first calibration group, the second calibration group, and the third calibration group, where the first coupling value is a sum of a coupling degree between the first calibration group and the second calibration group and a coupling degree between the first calibration group and the third calibration group, the second coupling value is a sum of a coupling degree between the second calibration group and the first calibration group and a coupling degree between the second calibration group and the third calibration group, and the third coupling value is a sum of a coupling degree between the third calibration group and the first calibration group and a coupling degree between the third calibration group and the second calibration group; and
  obtain a calibration sequence based on the first coupling value, the second coupling value, and the third coupling value, where the calibration sequence is used to represent a sequence of calibrating the first calibration group, the second calibration group, and the third calibration group.

In one embodiment, the first calibration information further includes the calibration sequence, information about the management AP of the second calibration group, and information about the management AP of the third calibration group.

In one embodiment, the processing unit is further configured to:
  obtain first path loss data, where the first path loss data is a path loss value between the first AP and the second AP that falls within a preset range and that is obtained at a third sampling moment;
  obtain second path loss data, where the second path loss data is a path loss value between the first AP and the second AP that falls within the preset range and that is obtained at a fourth sampling moment; and
  obtain path loss data between the first AP and the second AP based on the first path loss data and the second path loss data.

In one embodiment, the processing unit is configured to:
  use an average value of the first path loss data and the second path loss data as the path loss data between the first AP and the second AP; or
  obtain the path loss data between the first AP and the second AP based on the first path loss data, the second path loss data, and a weighted averaging algorithm.

In one embodiment, the processing unit is configured to:
  group the first AP and the second AP into the first calibration group based on path loss data between any two of the plurality of APs and a preset second algorithm, where the path loss data between any two APs includes the path loss data between the first AP and the second AP.

In one embodiment,
  the communications unit is further configured to receive a calibration request sent by the management AP of the first calibration group, where the calibration request includes an identifier of the management AP of the first calibration group and an identifier of an AP included in the first calibration group; and
  the processing unit is further configured to: obtain, based on the calibration request, path loss data of an AP set included in the first calibration group, and obtain a fourth calibration group based on the path loss data of the AP set included in the first calibration group, where an AP set included in the fourth calibration group is a subset of the AP set included in the first calibration group; and the communications unit is further configured to send fourth calibration information to a management AP of the fourth calibration group, where the fourth calibration information includes an identifier of an AP included in the fourth calibration group, and the management AP of the fourth calibration group is an AP that performs calibration management in the fourth calibration group.

In one embodiment, a quantity of APs in the first calibration group is less than or equal to a preset threshold, the preset threshold is a quantity of APs that a target AP can manage, and the target AP is an AP that manages a minimum quantity of APs in the AP set.

According to a third aspect, an embodiment of this application provides an AP group-based calibration device, including a processor, a communications interface, and a memory. The memory is configured to store instructions, the processor is configured to execute the instructions, and the communications interface is configured to receive or send data. When the processor executes the instructions, the method according to any one of the first aspect or the embodiments of the first aspect is performed.

According to a fourth aspect, this application provides a non-transitory computer storage medium. The non-transitory computer medium stores a computer program configured to perform group-based calibration. When the computer program is executed by a processor, the method according to any one of the first aspect or the embodiments of the first aspect is performed.

BRIEF DESCRIPTION OF DRAWINGS

FIG. 5 is a schematic diagram of calculating an average path loss value according to an embodiment of this application;

FIG. 6 is a schematic diagram of calibration information according to an embodiment of this application;

DESCRIPTION OF EMBODIMENTS

Figure 1A:
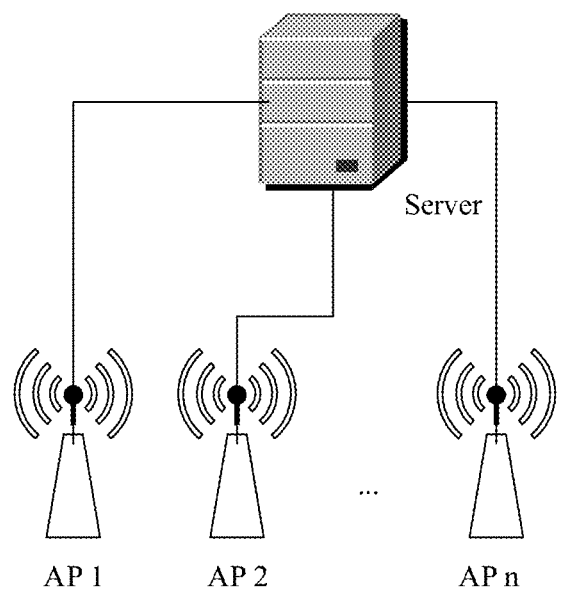
FIG. 1A is a schematic diagram of a system in which AP group-based calibration is performed according to an embodiment of this application.

The following describes technical solutions of this application with reference to the accompanying drawings.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

In embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one (piece) of a, b, or c may represent a, b, c, a and b, a and c, b and c, or a, b, and c, where a, b, and c may be singular or plural.

Any embodiment described as an "example" or "for example" in this application should not be explained as being more preferred or having more advantages than another embodiment. Exact, use of the word such as "example" or "for example" is intended to present a related concept in a particular manner.

To help a person skilled in the art better understand the technical solutions in this application, some concepts used in embodiments of this application are first described.

A path loss is also referred to as a propagation loss, and is referred to as a path loss in this application. The path loss is a loss generated when an electromagnetic wave propagates in space, and is caused by radiation and diffusion of a transmit power and by a propagation feature of a channel. Theoretically, path losses are the same for a same transmit-receive distance. In reality, an obstacle between a transmitter and a receiver causes an electromagnetic wave to reflect, scatter, and the like, causing a power of a signal to attenuate. Receive powers of receiving points at a same transmit-receive distance vary relatively greatly, and a receive power of a same receiving point also varies with different time points.

A coupling degree is a measurement of a degree of association between units. As association between units becomes stronger, coupling between the units becomes stronger, and independency between the units becomes poorer. Usually, the coupling degree is used to measure a degree of independency between the units.

A cloud AP is an AP managed by using a cloud management platform. Working modes of APs include a conventional mode and a cloud mode. In conventional mode, a network administrator needs to commission an AP at an installation site, imposing problems such as high deployment costs and difficult post-stage operation and maintenance. In cloud mode, after powering on, a cloud AP is automatically connected to a designated cloud management platform and loads a designated configuration file and the like. The cloud management platform implements centralized management and maintenance of devices at any location, greatly reducing network deployment, operation, and maintenance costs.

Calibration group: When channels are allocated to APs in a WLAN network based on a channel allocation algorithm, permutations and combinations of a plurality of channels of a plurality of APs need to be traversed, and a system interference value of each permutation and combination is calculated. Usually, a permutation and combination with a minimum interference value is selected and used as a final channel allocation result of the WLAN network. As a quantity of APs in a network increases, channel permutations and combinations increase exponentially, and resources that the channel allocation algorithm needs to consume also increase accordingly. To balance a resource effect and an algorithm effect, a large network is usually divided into a plurality of small groups, and channel combination computation is performed in each group. This can reduce a quantity of channel permutations and combinations, thereby reducing resource consumption. Such groups are referred to as calibration groups.

A management AP is an AP that is elected from a calibration group and that is responsible for functions such as channel power calibration and load balancing for APs in the entire group.

A WLAN technology can conveniently and rapidly provide network access to a user. This technology is applicable to environments with large user mobility and service requirements, for example, a public place, an enterprise, and a building. In these environments, APs need to be deployed at a high density to meet the requirements. To better manage and configure a plurality of APs, the plurality of APs are usually divided into different calibration groups by using a random grouping or manual grouping method. APs in a same calibration group report collected data to a management AP of the calibration group. The management AP of the calibration group performs calibration calculation and determines configuration information such as an allocated channel and a transmit power for the APs in the calibration group.

Random grouping: An AP is randomly aggregated with a nearby cloud AP that is reachable through a wired network, to form a group. When a quantity of APs in the group exceeds a management upper limit of a management AP, the group of APs stops expanding and forms a calibration group. The foregoing process is repeated, until all cloud APs at a site are grouped.

Manual grouping: In actual deployment, mostly a manual grouping manner is used to perform grouping. A plurality of APs are manually divided into a plurality of groups based on physical area continuity and a wireless visibility relationship (including factors such as a floor, a neighbor, and isolation) between APs. APs in the groups are wirelessly invisible to each other as far as possible, or as few as possible APs are wirelessly visible to each other. Each group of APs is set as a different virtual local area network (VLAN). In this way, each VLAN forms a calibration group. When an AP broadcasts in a layer 2 domain of the AP, the AP discovers only an AP in a calibration group in which the AP is located, and each group elects only a management AP of the group.

In the foregoing random grouping method, neighboring APs or APs on a same floor may be allocated to different calibration groups, so that path losses between the APs are relatively small. APs visible to each other are allocated to different calibration groups. In this way, a coupling degree between the calibration groups is relatively high, and the calibration groups with a high coupling degree have a poor calibration effect. In the foregoing manual grouping method, division is performed based on physical areas. However, due to complexity of a network environment, a physical distance between APs cannot completely represent a size of a path loss. Therefore, the problem of a poor calibration effect of the calibration groups due to a large coupling degree still occurs.

In addition, APs in each calibration group elect a management AP. The management AP is usually an AP with a relatively high hardware capability, an AP with a long startup time, or an AP with a smallest physical address in the calibration group. The management AP needs to perform calibration management on the APs in the calibration group, including periodical calibration of the APs in the calibration group, real-time calibration in case of an emergency (for example, when an AP in the calibration group goes online or offline), load balancing, intrusion detection, and the like. However, in a process of electing the management AP, the APs in the calibration group cannot obtain historical load information of each AP, for example, a quantity of long-term associated users and service traffic of each AP. Therefore, the elected management AP may have relatively heavy load. However, resources such as a central processing unit (CPU), internal memory, and communications overheads of the management AP are limited. Consequently, the management AP has insufficient resources to bear a calibration task, resulting in slow calibration convergence and a long calibration time.

To resolve the foregoing problem, this application provides a group-based calibration method. FIG. 1A is a schematic diagram of a system in which AP group-based calibration is performed according to an embodiment of this application. In the system, a control device is communicatively connected to an AP in an AP deployment site. All APs communicatively connected to the control device form an AP set. After powering on, an AP may periodically report service traffic, a service traffic rate, a quantity of associated users, channel utilization, and path loss information between the AP and any AP to the control device. The control device divides the APs in the AP set into a plurality of calibration groups based on an AI algorithm and path loss information reported by each AP in the AP set. This can decrease a coupling degree between the calibration groups. A management AP is designated for each calibration group based on load information of each AP in the calibration group. In this way, an AP with relatively light load is selected from each calibration group as a management AP, thereby increasing a convergence speed in calibration of a calibration group.

Figure 1B:
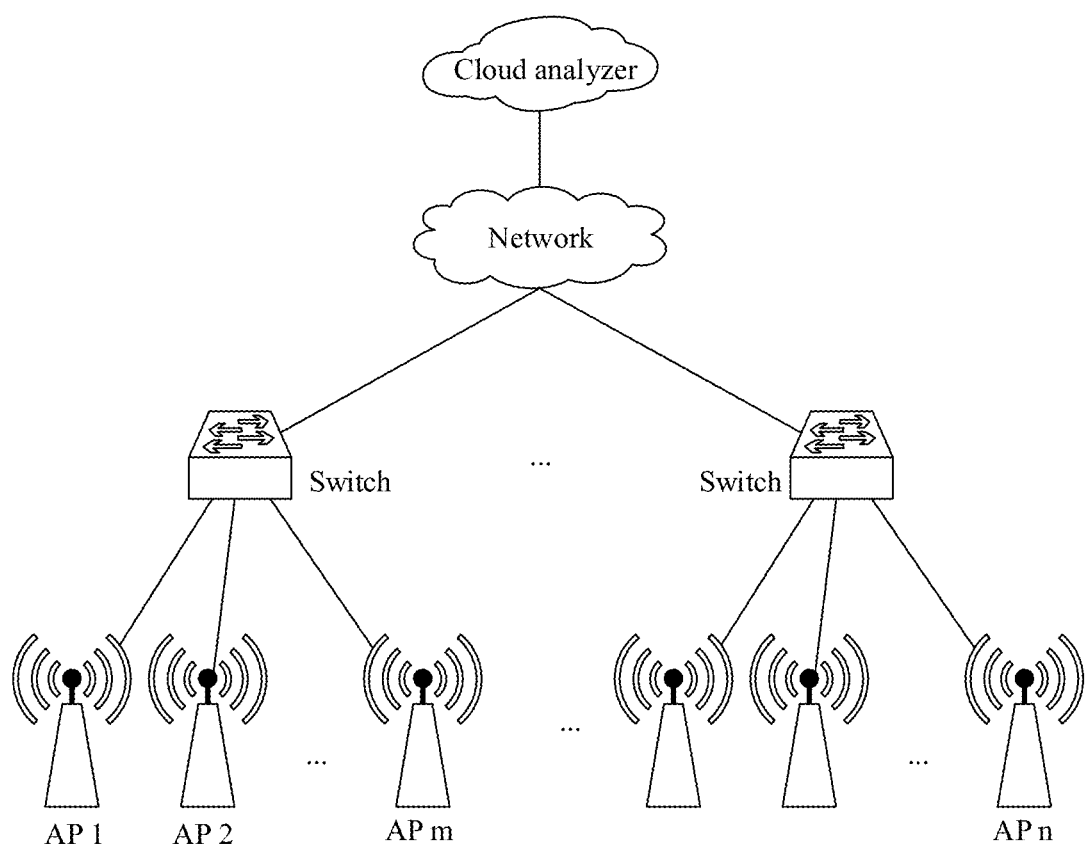
FIG. 1B is a schematic diagram of a system in which cloud AP group-based calibration is performed according to an embodiment of this application.

For example, the control device may be a device having a computing capability, for example, an access controller (AC) or a server deployed in the site, or may be a cloud analyzer deployed in a cloud. FIG. 1B is a schematic diagram of a system in which cloud AP group-based calibration is performed according to an embodiment of this application. A cloud analyzer communicates with a cloud AP through a network, a switch, and the like. Each cloud AP periodically reports load information and path loss information to the cloud analyzer through the network, so that the cloud analyzer implements the functions of dividing calibration groups and electing a management AP. The load information may include one or more of a service traffic rate, a quantity of associated users, and effective channel utilization. The effective channel utilization may be utilization of a channel occupied by the AP to receive data from and send data to an associated user. The channel utilization excludes channel utilization caused by external interference.

Figures 2, 3:
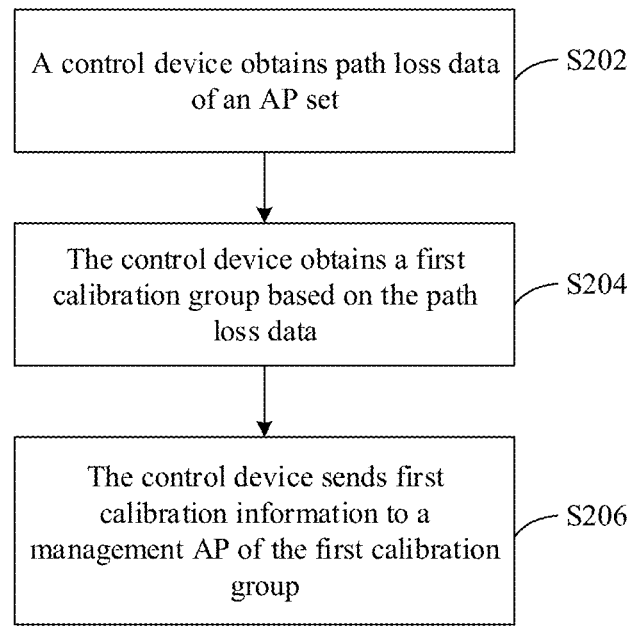
FIG. 2 is a schematic flowchart of a group-based calibration method according to an embodiment of this application.
FIG. 3 is a schematic diagram of path loss data reported by an AP set according to an embodiment of this application.

FIG. 2 is a schematic flowchart of a group-based calibration method according to an embodiment of this application. The method includes the following operations.

S202: A control device obtains path loss data of an AP set.

The AP set includes a plurality of APs managed by the control device. The path loss data includes a path loss between any two of the plurality of APs in the AP set.

In this embodiment of this application, the AP set includes n APs. For example, identifiers of the n APs are respectively AP 1 to AP n. In this embodiment of this application, the AP group-based calibration method is described in detail. After powering on and starting, any of the n APs sends a probe packet in a wireless manner based on a preset detection period. Any of the n APs receives a probe packet sent by another AP, and obtains a path loss value between the AP and the another AP based on the received probe packet sent by the another AP. Any of the n APs sends path loss data between the AP and the another AP to the control device. A probe packet includes an identifier of an AP that sends the probe packet and a transmit power for sending the probe packet.

Using the AP 1 as an example, the AP 1 sends a probe packet at a preset probe period. The probe packet includes an identifier of the AP 1 and a transmit power of the AP 1 for sending the probe packet. The AP 1 receives a probe packet sent by another AP. For example, the AP 1 may receive a probe packet sent by an AP 2. When receiving the probe packet sent by the AP 2, the AP 1 measures a received signal strength indicator (RSSI). The AP 1 obtains a path loss value between the AP 1 and the AP 2 based on the RSSI and a transmit power carried in the probe packet sent by the AP 2. For example, the path loss value between the AP 1 and the AP 2 may be a difference between the RSSI and the transmit power carried in the probe packet. By using the foregoing manner, each AP in the AP set may calculate path loss values between the AP and other APs in the AP set, and then send a plurality of obtained path loss values to the control device.

For example, each time obtaining a group of path loss values between the AP 1 and other APs through calculation, the AP 1 may send the group of path loss values to the control device. Alternatively, the AP 1 may send a plurality of groups of path loss values obtained in a preset first report period to the control device. For example, a probe period of the AP 1 is 20 seconds and a report period is 30 minutes. Then, the AP 1 reports 90 groups of path loss values to the control device at an interval of 30 minutes. This is not limited in this embodiment of this application.

In this embodiment of this application, after receiving a path loss value sent by each AP in the AP set, the control device may obtain a path loss value between each AP pair in the AP set. An AP pair is two APs in the AP set that both can receive a probe packet sent by the other party. FIG. 3 shows path loss data of the AP set received by the control device. The path loss data of the AP set includes a path loss value between any two of the plurality of APs in the AP set. An AP in the AP set sends a path loss value to the control device at the preset first report period. The control device receives a path loss value that is sent by each AP and that is between the AP and another AP, and stores the path loss value. Before a calibration moment, the control device calculates received data, to obtain an average path loss value between each AP pair in a calibration period, and uses average path loss values between all AP pairs as the path loss data of the AP set.

Figure 4:
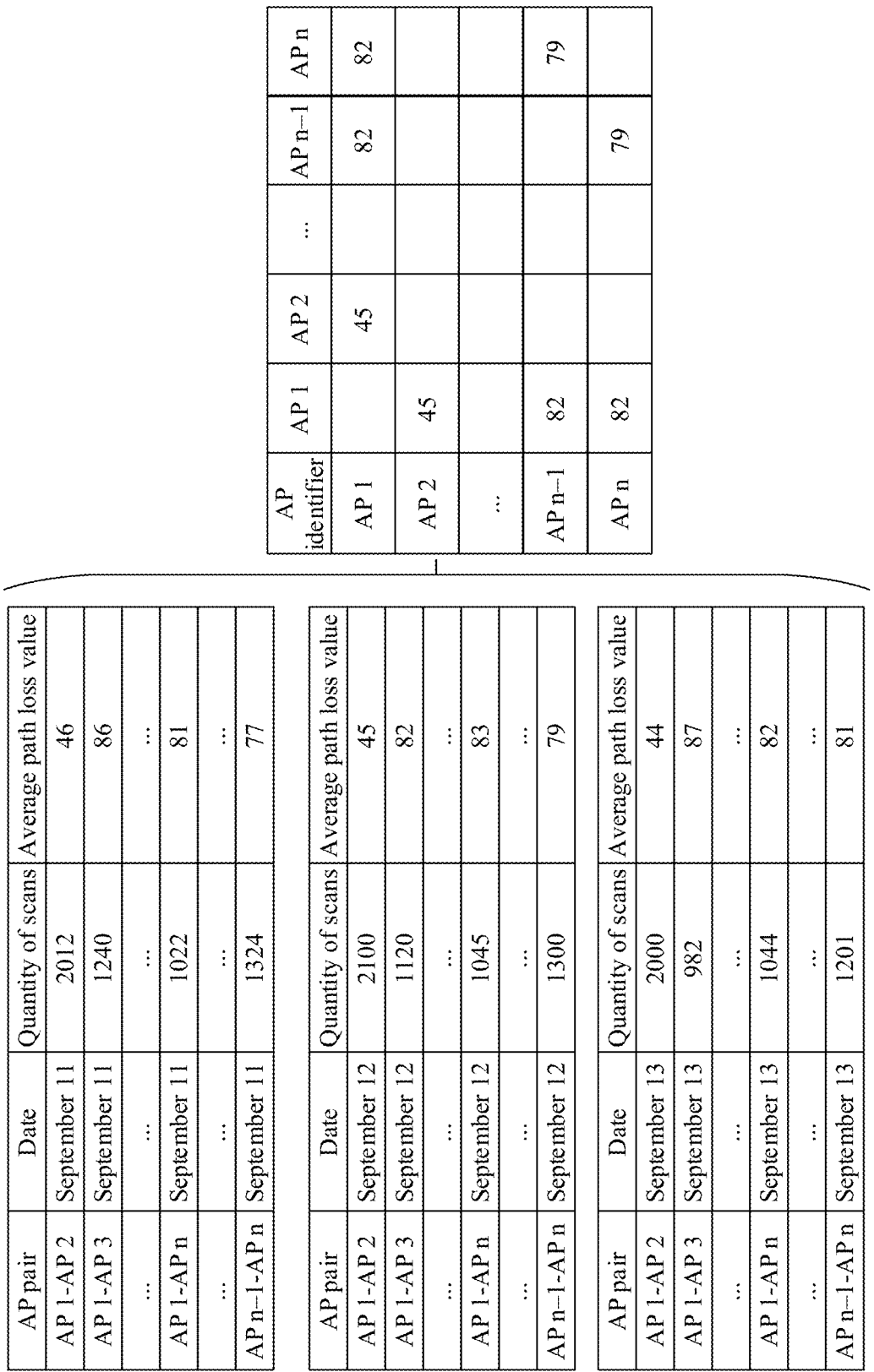
FIG. 4 is a schematic diagram of average path loss values of APs according to an embodiment of this application.

For example, if an AP calibration period is 24 hours, that is, the control device performs calculation and divides calibration groups at an interval of 24 hours, the control device may obtain at most 90×24=2160 path loss values of each AP pair in each calibration period. When the control device divides calibration groups, the control device calculates an average value of a plurality of path loss values corresponding to each AP pair and uses the average value as path loss data of the AP set in the calibration period. Alternatively, the control device may use an average value of path loss values of each AP pair obtained in a plurality of calibration periods as path loss data of the AP set in the calibration period. For example, as shown in FIG. 4, the control device calculates an average path loss value of each AP pair once at an interval of 24 hours and stores the average path loss value. A quantity of scans means a quantity of times that two APs in an AP pair receive a probe packet sent by the other party in a calibration period. When dividing calibration groups, the control device may first calculate an average path loss value of each AP pair in the calibration period and use the average path loss value as the path loss data of the AP set in the calibration period. Then, the control device obtains path loss data of the AP set in two calibration periods before the calibration period; then calculates an average value of path loss values of each AP pair in the path loss data in the three calibration periods; and uses the average value as final path loss data of the AP set in the calibration period. For example, as shown in FIG. 4, a current calibration period is a calibration period corresponding to September 13. In the calibration period, the AP 1 and the AP 2 scan each other for 2000 times, and a path loss in each of the 2000 times is 44. In two calibration periods before the calibration period, average path loss values between the AP 1 and the AP 2 are respectively 46 and 45. An average path loss value between the AP 1 and the AP 2 in these three calibration periods is 45. Then, 45 is used as a final average path loss value between the AP 1 and the AP 2 in the calibration period.

In one embodiment, after receiving the path loss values sent by the APs, the control device may calculate, based on a plurality of historical path loss values corresponding to a target AP pair, an average value of the historical path loss values of the target AP pair. The control device determines an effective path loss range based on the average value of the historical path loss values of the target AP pair. If a path loss value of the target AP pair subsequently received by the control device fails within the effective path loss range, the path loss value is considered as valid data, and the path loss value is saved as a historical path loss value of the target AP pair. If the path loss value of the target AP pair does not fall within the effective path loss range, the value is discarded. Using the AP pair including the AP 1 and the AP 2 as an example, before a particular moment, an average value of historical path loss values corresponding to the AP pair is 50, and an effective path loss range is [40, 60]. If a path loss value of the AP pair obtained by the control device after the moment is greater than or equal to 40 and less than or equal to 60, the control device determines that the path loss value is a valid value and saves the path loss value as a historical path loss value. If the path loss value is less than 40 or greater than 60, the control device does not save the path loss value.

S204: The control device obtains a first calibration group based on the path loss data.

After obtaining the path loss data of the AP set, the control device groups a plurality of APs in the AP set into a calibration group based on a preset AI algorithm and the average path loss value between each AP pair, so as to obtain a plurality of calibration groups. An average path loss value between an AP pair is path loss data between the AP pair. The AI algorithm may be one or more of a k-means clustering algorithm (k-means), a Jaccard similarity matrix algorithm, and a spectral clustering algorithm. This is not limited in this embodiment of this application.

In one embodiment, the control device obtains, through calculation based on path loss values between a first AP pair that are obtained at different sampling points in first duration, an average path loss value that is between the first AP pair and that corresponds to the first duration. The control device obtains, through calculation based on path loss values between the first AP pair that are obtained at different sampling points in second duration, an average path loss value that is between the first AP pair and that corresponds to the second duration. The first duration and the second duration are the same. For example, values of the first duration and the second duration may be one day, one week, or one hour, which is not limited in this embodiment of this application. The control device obtains path loss data of the first AP pair based on the average path loss value that is between the first AP pair and that corresponds to the first duration, a quantity of sampling operations (also referred to a quantity of scans) in the first duration, the average path loss value that is between the first AP pair and that corresponds to the second duration, a quantity of sampling operations (also referred to a quantity of scans) in the second duration, and a weighted averaging algorithm. The path loss data of the first AP pair is a quotient obtained by dividing a sum of a first product and a second product by a total quantity of sampling operations. The first product is a product of the average path loss value that is between the first AP pair and that corresponds to the first duration and the quantity of sampling operations in the first duration. The second product is a product of the average path loss value that is between the first AP pair and that corresponds to the second duration and the quantity of sampling operations in the second duration. The total quantity of sampling operations is a sum of the quantity of sampling operations in the first duration and the quantity of sampling operations in the second duration. The control device may obtain average path loss values between a plurality of AP pairs in the AP set by using the method of obtaining the average path loss value between the first AP pair. The control device obtains, based on the average path loss values between the plurality of AP pairs, a topology matrix used to record the average path loss values of the plurality of AP pairs, as shown in FIG. 4. The control device obtains a neighbor relationship matrix based on the topology matrix and a path loss threshold. For example, an average path loss value of the AP pair including the AP 1 and the AP 2 in the topology matrix is a negative value, and the average path loss value of the AP pair including the AP 1 and the AP 2 is greater than the path loss threshold. Then, it is considered that a neighbor relationship exists between the AP 1 and the AP 2. An average path loss value of an AP pair including the AP 1 and an AP 3 in the topology matrix is a negative value, and the average path loss value of the AP pair including the AP 1 and the AP 3 is less than or equal to the path loss threshold. Then, it is considered that a neighbor relationship does not exist between the AP 1 and the AP 3. An average path loss value of the AP pair including the AP 1 and the AP 2 in the topology matrix is a positive value, and the average path loss value of the AP pair including the AP 1 and the AP 2 is less than the path loss threshold. Then, it is considered that a neighbor relationship exists between the AP 1 and the AP 2. An average path loss value of an AP pair including the AP 1 and an AP 3 in the topology matrix is a positive value, and the average path loss value of the AP pair including the AP 1 and the AP 3 is greater than or equal to the path loss threshold. Then, it is considered that a neighbor relationship does not exist between the AP 1 and the AP 3. The control device obtains a similarity matrix based on the neighbor relationship matrix and the Jaccard similarity matrix algorithm. The control device obtains, based on the similarity matrix and the spectral density clustering algorithm, a quantity of calibration groups and APs included in each calibration group. In one embodiment, after obtaining the similarity matrix, the control device may obtain the quantity of calibration groups and the APs included in each calibration group by using the k-means algorithm in the spectral density clustering algorithm.

In one embodiment, the control device may group, into one calibration group based on path loss data corresponding to each AP pair in the AP set and the AI algorithm, APs that are of the AP pairs and whose path loss values fall within a particular interval range. The AI algorithm is used to perform clustering analysis on a plurality of APs. For example, a path loss between the AP 1 and the AP 2 is a1, a path loss between the AP 1 and an AP 3 is a2, a path loss between the AP 2 and the AP 3 is a3, a3 is less than a1 and less than a2, and values of a1 and a2 are closer to each other. The control device can determine, by using the AI algorithm based on the values of a1, a2, and a3, that the AP 1 is relatively far away from the AP 2 and the AP 3 and the path losses are relatively large, and that the AP 2 and the AP 3 are closer to each other and the path loss is relatively small. Therefore, the AP 2 and the AP 3 are grouped into one calibration group. When calibration groups are divided by using the foregoing method, two APs with a large average path loss value are allocated to different calibration groups, so that APs in different calibration groups are invisible to each other, thereby decreasing a coupling degree between different calibration groups. The first calibration group is any one of the plurality of calibration groups obtained through division. The first calibration group includes a first AP and a second AP of the plurality of APs in the AP set. For example, the first AP may be the AP 2, and the second AP may be the AP 3.

For example, quantities of APs that the APs in the AP set can manage may be different. When dividing the APs into calibration groups, the control device needs to limit a quantity of APs in each calibration group. In this embodiment of this application, the control device further needs to obtain a quantity of APs that each AP in the AP set can manage. The control device uses, as a constraint condition of the AI algorithm, a minimum value of the obtained quantities of APs that the APs can manage. In this way, a quantity of APs in each calibration group obtained through division based on the AI algorithm is less than or equal to the minimum value, thereby preventing an actual quantity of APs in a calibration group from exceeding a quantity of APs that a management AP of the calibration group can manage.

S206: The control device sends first calibration information to a management AP of the first calibration group.

The management AP of the first calibration group is an AP that performs calibration management in the first calibration group. The first calibration information includes identification information of a plurality of APs in the first calibration group. For example, the first calibration information includes an identifier of the AP 2 and an identifier of the AP 3.

After receiving the calibration information, the management AP of the first calibration group determines, based on identifiers of the APs carried in the first calibration information, the APs managed by the management AP; and starts calibration, to allocate a channel to the APs in the first calibration group by using a channel allocation algorithm and also allocate a transmit power to each AP.

By implementing the method in the foregoing embodiment, each AP in the AP set periodically obtains path loss data between the AP and another AP in the AP set, and sends the obtained path loss data to the control device that manages the plurality of APs in the AP set in a centralized manner. The control device groups the plurality of APs in the AP set based on the path loss data, so that two APs with a large path loss between each other can be allocated to different calibration groups. In this way, APs in different calibration groups are invisible to each other, thereby decreasing a coupling degree between different calibration groups and improving a calibration effect for a WLAN network.

In this embodiment of this application, before the first calibration information is sent to the management AP of the first calibration group in S206, the method further includes:

S205: The control device determines the management AP of the first calibration group based on load information of each AP in the first calibration group.

The load information includes at least one of a quantity of users associated with each AP and channel utilization and a transmission rate of each AP. Each AP in the AP set not only reports path loss data of the AP to the control device at the preset first report period, but also uploads load information of the AP to the control device at a preset second report period. After dividing the AP set into the plurality of calibration groups based on the path loss data of the AP set, the control device determines a management AP for each calibration group based on load information of APs in the calibration group, and sends calibration information corresponding to each calibration group to the management AP corresponding to the calibration group. The second report period may be the same as the first report period, or may be different from the first report period. This is not limited in this embodiment of this application.

Using the first calibration group as an example, after obtaining the first calibration group based on the path loss data, the control device obtains a plurality of pieces of load data corresponding to each AP in the first calibration group; then predicts a predicted load value of each AP in a next calibration period based on the load data of each AP in the first calibration group; then determines an AP as a management AP of the first calibration group in the next calibration period based on the predicted load value of each AP in the first calibration group; and sends calibration information of the first calibration group to the determined management AP of the first calibration group. The control device may obtain the predicted load value of each AP in the next calibration period by using a prediction algorithm, for example, a gradient boosting decision tree (GBDT) algorithm, a long short-term memory (LSTM) network, or a time series algorithm.

Using the AP 1 in the first calibration group as an example, the AP 1 collects corresponding load data at a preset time interval and sends the collected load data to the control device. If the preset time interval is 1 minute, load data collected by the AP 1 is shown in FIG. 5. Data collected by the AP 1 at each sampling moment is one group of load data, and the one group of load data includes the sampling moment, a quantity of users associated with the AP 1, channel utilization of each AP, and a transmission rate. After obtaining a plurality of groups of load data through a plurality of collections, the AP 1 may send the plurality of groups of collected load data to the control device. For example, the AP 1 may send 30 groups of collected load data to the control device at an interval of 30 minutes. After receiving the 30 groups of load data uploaded by the AP 1, the control device obtains a comprehensive load value of the AP 1 in the 30 minutes through calculation based on the 30 groups of load information, and stores the comprehensive load value.

In one embodiment, the control device obtains a load value corresponding to each group of load data by performing weighted calculation on a value of a transmission rate, a value of a quantity of associated users, and a value of channel utilization in the group of load data. The load value represents a load status of the AP 1 in the 1 minute. The control device obtains 30 load values through calculating the 30 groups of load data, and uses a maximum value or an average value of the 30 load values as a comprehensive load value of the AP 1 in the 30 minutes and records the comprehensive load value.

In this embodiment of this application, a moment at which the control device receives a plurality of groups of load data sent by the AP 1 is used as a load sampling moment of the control device. The control device may obtain a plurality of load values corresponding to the AP 1 through calculation based on load data of the AP 1 obtained at a plurality of load sampling moments, and predicts a load value of the AP 1 at a load sampling moment based on the plurality of load values and a preset prediction algorithm. For example, at a first load sampling moment, the control device obtains a load value corresponding to the AP 1 through calculation based on 30 groups of load data uploaded by the AP 1; and at a second load sampling moment, the control device obtains a load value corresponding to the AP 1 through calculation based on another 30 groups of load data uploaded by the AP 1. The control device may obtain a load value of the AP 1 at a next load sampling moment through calculation based on the load values obtained at the two load sampling moments in combination with the preset prediction algorithm. It should be noted that the control device may alternatively calculate the load value of the AP 1 at the next load sampling moment based on data obtained at more than two sampling moments.

According to the same method, the control device may predict a load value of another AP in the first calibration group at the next load sampling moment, and then determine an AP with lightest load as the management AP of the first calibration group in the next calibration period based on a load value of each AP in the first calibration group at the next load sampling moment.

APs in each calibration group periodically obtain their respective load information such as quantities of associated users, channel utilization, and transmission rates, and send the obtained load information to the control device. The control device determines load of each AP in the next calibration period based on the preset prediction algorithm in combination with historical load information of each AP, and selects an AP with lightest load as a leader AP of the calibration group in the next calibration period. In this way, the leader AP has a light service, and therefore has sufficient resources to bear a calibration task.

In one embodiment, after the control device divides the AP set into the plurality of calibration groups, the control device may further calculate coupling degrees between each calibration group and other calibration groups, add up the coupling degrees between each calibration group and other calibration groups to obtain a coupling degree metric of each calibration group, and then determines a calibration sequence of the calibration groups based on the coupling degree metric of each calibration group. For example, the control device divides the AP set into three calibration groups: the first calibration group, a second calibration group, and a third calibration group. If the control device obtains through calculation that a coupling degree between the first calibration group and the second calibration group is C12, a coupling degree between the first calibration group and the third calibration group is C13, a coupling degree between the second calibration group and the first calibration group is C21, a coupling degree between the second calibration group and the third calibration group is C23, a coupling degree between the third calibration group and the first calibration group is C31, and a coupling degree between the third calibration group and the second calibration group is C32, a coupling degree metric of the first calibration group is C1=C12+C13, a coupling degree metric of the second calibration group is C2=C21+C23, and a coupling degree metric of the third calibration group is C3=C31+C32, where C12=C21, C13=C31, C23=C32.

In one embodiment, a method of calculating a coupling degree between the first calibration group and the second calibration group is: calculating path loss values between m APs in the first calibration group and n APs in the second calibration group, to obtain m×n path loss values; and adding up the m×n path loss values to obtain a sum, where an obtained value is the coupling degree between the first calibration group and the second calibration group. When a path loss value is used to represent a coupling degree between calibration groups, a larger path loss value means smaller interference between two APs. Therefore, a larger path loss value means a smaller coupling degree between two APs. In other words, a larger value obtained through the addition means a smaller coupling degree between the two calibration groups. Therefore, a larger coupling degree metric means a smaller coupling degree between a corresponding calibration group and another calibration group, and a smaller coupling degree metric means a larger coupling degree between a corresponding calibration group and another calibration group.

After obtaining the coupling degree metric of each calibration group through calculation, the control device determines a calibration sequence of the calibration groups based on a value of the coupling degree metric of each calibration group. For the coupling degree metrics of the calibration groups obtained through calculation based on the path loss values, a larger coupling degree metric means a later position in the calibration sequence. For example, a relationship between the coupling degree metrics of the foregoing three calibration groups is C1>C3>C2. Then, the second calibration group of the three calibration groups is calibrated first, the third calibration group is calibrated next, and finally the first calibration group is calibrated. After obtaining calibration information, a leader AP of each calibration group performs calibration in sequence based on the calibration sequence. During calibration, a calibration group calibrated later scans and obtains a channel used by an AP in a calibration group that has been calibrated, and the leader AP determines a channel of each AP in the calibration group based on the channel allocation algorithm, to decrease a coupling degree between the calibration groups.

By using the foregoing method, calibration information obtained by the control device after performing group-based calibration on the APs in the AP set includes: a management AP of each calibration group, a quantity of APs in each calibration group, identification information of member APs in each calibration group, and a calibration sequence of the calibration groups. For example, the AP set includes 10 APs. Then, calibration information obtained by the control device is shown in FIG. 6.

For example, when the control device determines the calibration sequence of the calibration groups, the calibration information sent by the control device to the management AP in S206 further includes calibration sequence information, so that the management AP of each calibration group determines a calibration starting moment based on the calibration sequence. In one embodiment, the control device may directly send the calibration sequence information of the calibration groups to the management AP of each calibration group. When a management AP of a calibration group determines that the calibration group in which the management AP is located has been calibrated, the management AP determines a management AP of a next calibration group based on the received calibration sequence information, and then sends calibration complete notification information to the management AP of the next calibration group. The notification information is used to indicate the management AP that receives the notification information to start calibration. Alternatively, starting duration is configured for each AP in the AP set. When a management AP receives the calibration sequence information, the management AP may determine, based on a calibration order corresponding to the management AP in the calibration sequence information and the starting duration, interval duration from a moment of receiving the calibration sequence sent by the control device to a moment when the management device can start calibration. For example, the starting duration is 2 minutes. A calibration order of the second calibration group is 1. Therefore, after receiving the calibration sequence information sent by the control device, the second calibration group can immediately start calibration. A calibration order of the third calibration group is 2. Then, the third calibration group needs to start a timing function after receiving the calibration information sent by the control device, and starts calibration 2 minutes later. The first calibration group needs to start calibration 4 minutes later after receiving the calibration information sent by the control device.

The control device calculates coupling degrees between each calibration group and other calibration groups, and formulates a calibration sequence of the calibration groups based on the coupling degrees. In this way, during calibration, a calibration group may obtain a calibration result of a calibration group that has been calibrated, so that channel allocation is performed based on the calibration result of the calibration group that has been calibrated. This can avoid a problem, during simultaneous calibration of a plurality of calibration groups, that a large coupling degree between the calibration groups is caused after the calibration because the calibration groups do not interact with each other.

In this embodiment of this application, the control device divides the plurality of APs in the AP set into calibration groups, and determines a management AP and a calibration order for each calibration group. In addition, a group-based calibration process is performed periodically. Before each calibration moment, the management AP of each calibration group in the AP set sends a calibration request to the control device. After receiving the calibration request, the control device performs the foregoing process of dividing calibration groups and determining a management AP and a calibration order based on path loss data, load information, and the like that are received before receiving the calibration request.

For example, the management AP of the first calibration group sends a calibration request to the control device. The calibration request includes an identifier of the management AP of the first calibration group and identifiers of the APs included in the first calibration group. The control device obtains, based on the identifiers of the APs in the calibration request, path loss data of the APs included in the first calibration group. The control device obtains a fourth calibration group based on the path loss data of the APs included in the first calibration group. APs included in the fourth calibration group are a subset of the APs included in the first calibration group. Then, the control device sends fourth calibration information to a management AP of the fourth calibration group. The fourth calibration information includes identifiers of the APs included in the fourth calibration group, and the management AP of the fourth calibration group is an AP that performs calibration management in the fourth calibration group.

When the APs in the AP set start for the first time, calibration groups may be generated in the foregoing random grouping or manual grouping manner, and a management AP of each calibration group is elected. Before a first calibration moment, the management AP of each calibration group sends a calibration request to the control device, and the control device divides calibration groups and determines a management AP and a calibration order for each calibration group. After the control device groups the APs in the AP set for the first time and determines the management AP of each calibration group, the management AP determined by the control device sends a calibration request to the control device.

Figure 7:
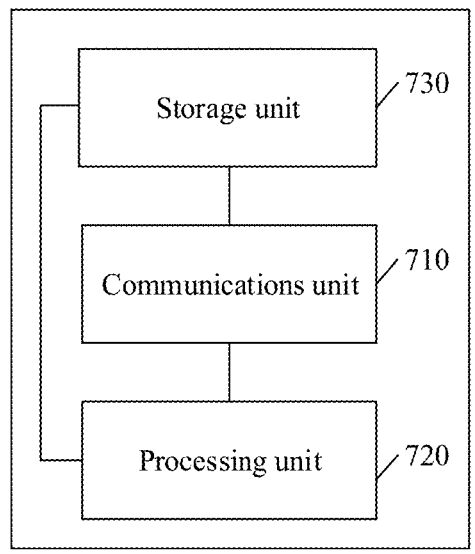
FIG. 7 is a schematic diagram of a group-based calibration apparatus according to an embodiment of this application.

The foregoing describes in detail the group-based calibration method provided in embodiments of this application with reference to FIG. 1A to FIG. 6. The following describes an apparatus and a device related to group-based calibration provided in embodiments of this application with reference to FIG. 7 and FIG. 8. FIG. 7 is a schematic diagram of a structure of a group-based calibration apparatus according to an embodiment of this application. The apparatus is applied to the system shown in FIG. 1A or FIG. 1B. The apparatus 700 includes a communications unit 710 and a processing unit 720.

The communications unit 710 is configured to obtain path loss data of an AP set, where the AP set includes a plurality of APs managed by a control device, and the path loss data includes a path loss between any two of the plurality of APs in the AP set.

The processing unit 720 obtains a first calibration group based on the path loss data. The first calibration group is any one of a plurality of calibration groups obtained by dividing the AP set, and the first calibration group includes some APs in the AP set, for example, including an AP 1 and an AP 2 in the AP set.

The communications unit 710 is further configured to send first calibration information to a management AP of the first calibration group, where the first calibration information includes identifiers of the APs in the first calibration group, and the management AP of the first calibration group is an AP that performs calibration management in the first calibration group.

In one embodiment, the communications unit 710 is further configured to obtain load information of the AP 1 and the AP 2, where the load information includes at least one of a transmission rate, channel utilization, and a quantity of associated users.

The processing unit 720 is further configured to: obtain a first load value through calculation based on a preset algorithm and the load information of the AP 1, obtain a second load value through calculation based on the preset algorithm and the load information of the AP 2, and determine the management AP of the first calibration group from the AP 1 and the AP 2 based on the first load value and the second load value.

The processing unit 720 is further configured to calculate coupling degree metrics between the first calibration group and a plurality of other calibration groups, and determine a calibration sequence of the calibration groups based on the coupling degree metrics.

In one embodiment, the apparatus 700 may further include a storage unit 730. The storage unit is configured to store path loss data, load information, and the like reported by the APs.

In one embodiment, for operations performed by the group-based calibration apparatus 700 in the apparatus embodiment, refer to related operations of the control device in the foregoing method embodiment. Details are not described herein again. The group-based calibration apparatus may be an independent device, for example, a server; or may be a unit having storage, communication, and computing capabilities. This is not limited in this embodiment of this application.

Figure 8:
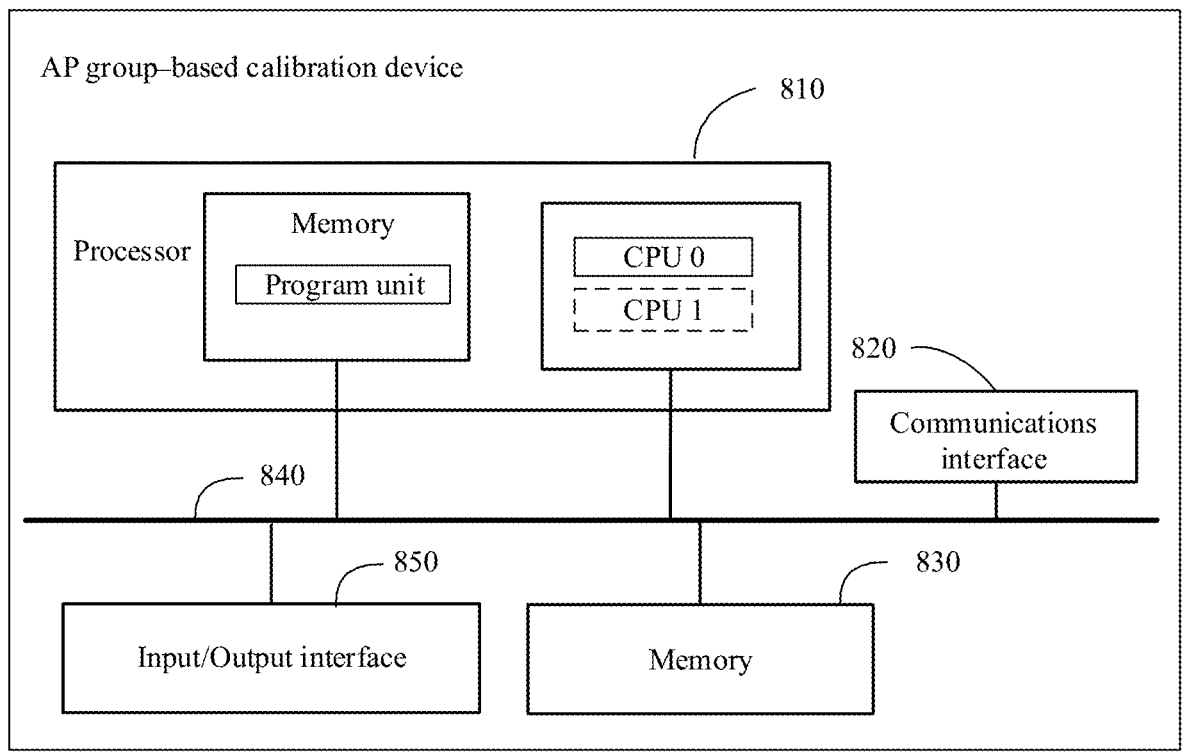
FIG. 8 is a schematic diagram of a group-based calibration device according to an embodiment of this application.

FIG. 8 is a schematic diagram of a structure of an AP group-based calibration device according to an embodiment of this application. The AP group-based calibration device 800 includes at least a processor 810, a communications interface 820, and a memory 830. The processor 810, the communications interface 820, and the memory 830 are connected to each other by using a bus 840.

For an embodiment of performing various operations by the processor 810, refer to operations of the control device in the foregoing method embodiment. The processor 810 may have a plurality of embodiments. For example, the processor 810 may be a central processing unit (CPU) or a graphics processing unit (GPU). The processor 810 may alternatively be a single-core processor or a multi-core processor. The processor 810 may be a combination of a CPU and a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor 810 may alternatively be implemented independently by using a logic device with embedded processing logic, for example, an FPGA or a digital signal processor (DSP).

The communications interface 820 may be a wired interface or a wireless interface, and is configured to communicate with another unit or device. The wired interface may be an Ethernet interface or a local interconnect network (LIN). The wireless interface may be a cellular network interface, a wireless local area network interface, or the like. For example, the communications interface 820 in this embodiment of this application may be configured to receive path loss data of each AP pair in an AP set, load information of each AP, and the like.

The bus 840 may be classified into an address bus, a data bus, a control bus, and the like. For ease of representation, only one bold line is used to represent the bus in FIG. 8, but this does not mean that there is only one bus or only one type of bus.

Usually, the memory 830 is also referred to as an external memory. A storage medium of the memory 830 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. For example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory 830 is configured to store program code and data. The processor 810 implements grouping of the AP set, determining of a management AP, and the like by calling the program code and historical data such as path losses and the load information of the AP that are stored in the memory 830. In addition, the AP group-based calibration device 800 may include more or fewer components than those shown in FIG. 8, or have a different component configuration manner.

In one embodiment, the AP group-based calibration device may further include an input/output interface 850. The input/output interface 850 is connected to an input/output device, and is configured to receive input information and output an operation result. The input/output interface 850 may be a CAN bus interface or another internal bus interface.

An embodiment of the present application further provides a non-transient computer storage medium. The non-transient computer storage medium stores instructions. When the instructions are run on a processor, method operations in the foregoing method embodiments may be implemented. For an embodiment of performing the method operations by the processor of the non-transient computer storage medium, refer to operations in the foregoing method embodiments. Details are not described herein again.

All or some of the foregoing embodiments may be implemented by using software, hardware, or any combination thereof. When software is used to implement embodiments, embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

Sequence adjustment, combination, or deletion may be performed on operations in the method in embodiments of this application based on an actual requirement. The units in the apparatus in embodiments of this application may be divided, combined, or deleted based on the actual requirement.

Embodiments of this application are described in detail above. The principles and embodiments of this application are described herein through examples. The descriptions about embodiments are merely provided to help understand the method and core ideas of this application. In addition, a person of ordinary skill in the art can make variations and modifications to this application in terms of the embodiments and application scopes according to the ideas of this application. Therefore, the content of this specification shall not be construed as a limit to this application.

What is claimed is:

1. A wireless access point (AP) group-based calibration method comprising:
 obtaining, by a control device, path loss data of a wireless AP set, wherein the AP set comprises a plurality of APs, and the path loss data comprises a path loss between any two of the plurality of APs;
 obtaining, by the control device, a first calibration group based on the path loss data, wherein the first calibration group comprises a first AP and a second AP of the plurality of APs, wherein the obtaining the path loss data of the AP set comprises:
  obtaining, by the control device, first path loss data, wherein the first path loss data is a path loss value between the first AP and the second AP that falls within a preset range and that is obtained at a third sampling moment;
  obtaining, by the control device, second path loss data, wherein the second path loss data is a path loss value between the first AP and the second AP that falls within the preset range and that is obtained at a fourth sampling moment; and
  obtaining, by the control device, path loss data between the first AP and the second AP based on the first path loss data and the second path loss data; and
 sending, by the control device, first calibration information to a management AP of the first calibration group, wherein the first calibration information comprises an identifier of the first AP, an identifier of the second AP, and calibration sequence information for the management AP of the first calibration group to determine a calibration starting moment based on the calibration sequence information, and wherein the management AP of the first calibration group is an AP that performs calibration management in the first calibration group.

2. The method according to claim 1, wherein before the sending, by the control device, first calibration information to a management AP of the first calibration group, the method further comprises:
 obtaining, by the control device, load information of the first AP and load information of the second AP, wherein the load information of the first AP comprises load data of the first AP collected at a first sampling moment and load data of the first AP collected at a second sampling moment, the load information of the second AP comprises load data of the second AP collected at the first sampling moment and load data of the second AP collected at the second sampling moment, and the load data comprises at least one of a transmission rate, channel utilization, and a quantity of associated users;
 obtaining, by the control device, a first load value based on a preset first algorithm, the load data of the first AP collected at the first sampling moment, and the load data of the first AP collected at the second sampling moment;
 obtaining, by the control device, a second load value based on the preset first algorithm, the load data of the second AP collected at the first sampling moment, and the load data of the second AP collected at the second sampling moment; and
 determining, by the control device, the management AP of the first calibration group from the first AP and the second AP based on the first load value and the second load value.

3. The method according to claim 1, wherein the method further comprises:

obtaining, by the control device, a second calibration group and a third calibration group based on the path loss data, wherein the second calibration group comprises a third AP and a fourth AP of the plurality of Aps, and the third calibration group comprises a fifth AP and a sixth AP of the plurality of Aps; and sending, by the control device, second calibration information to a management AP of the second calibration group and third calibration information to a management AP of the third calibration group, wherein the second calibration information comprises an identifier of the third AP and an identifier of the fourth AP, the management AP of the second calibration group is an AP that performs calibration management in the second calibration group, the third calibration information comprises an identifier of the fifth AP and an identifier of the sixth AP, and the management AP of the third calibration group is an AP that performs calibration management in the third calibration group.

4. The method according to claim 3, wherein the method further comprises:

calculating, by the control device, a first coupling value, a second coupling value, and a third coupling value based on the first calibration group, the second calibration group, and the third calibration group, wherein the first coupling value is a sum of a coupling degree between the first calibration group and the second calibration group and a coupling degree between the first calibration group and the third calibration group, the second coupling value is a sum of a coupling degree between the second calibration group and the first calibration group and a coupling degree between the second calibration group and the third calibration group, and the third coupling value is a sum of a coupling degree between the third calibration group and the first calibration group and a coupling degree between the third calibration group and the second calibration group; and obtaining, by the control device, a calibration sequence of the calibration sequence information based on the first coupling value, the second coupling value, and the third coupling value, wherein the calibration sequence is used to represent a sequence of calibrating the first calibration group, the second calibration group, and the third calibration group.

5. The method according to claim 4, wherein the first calibration information further comprises the calibration sequence, information about the management AP of the second calibration group, and information about the management AP of the third calibration group.

6. The method according to claim 1, wherein the obtaining, by the control device, path loss data between the first AP and the second AP based on the first path loss data and the second path loss data comprises:

using, by the control device, an average value of the first path loss data and the second path loss data as the path loss data between the first AP and the second AP; or obtaining, by the control device, the path loss data between the first AP and the second AP based on the first path loss data, the second path loss data, and a weighted averaging algorithm.

7. The method according to claim 1, wherein the obtaining, by the control device, a first calibration group based on the path loss data comprises:

grouping, by the control device, the first AP and the second AP into the first calibration group based on path loss data between any two of the plurality of Aps and a preset second algorithm, wherein the path loss data between any two Aps comprises the path loss data between the first AP and the second AP.

8. The method according to claim 1, wherein the method further comprises:

receiving, by the control device, a calibration request sent by the management AP of the first calibration group, wherein the calibration request comprises an identifier of the management AP of the first calibration group and an identifier of an AP comprised in the first calibration group;

obtaining, by the control device based on the calibration request, path loss data of an AP set comprised in the first calibration group;

obtaining, by the control device, a fourth calibration group based on the path loss data of the AP set comprised in the first calibration group, wherein an AP set comprised in the fourth calibration group is a subset of the AP set comprised in the first calibration group; and sending, by the control device, fourth calibration information to a management AP of the fourth calibration group, wherein the fourth calibration information comprises an identifier of an AP comprised in the fourth calibration group, and the management AP of the fourth calibration group is an AP that performs calibration management in the fourth calibration group.

9. The method according to claim 1, wherein a quantity of Aps in the first calibration group is less than or equal to a preset threshold, the preset threshold is a quantity of Aps that a target AP is capable of managing, and the target AP is an AP that manages a minimum quantity of Aps in the AP set.

10. A wireless access point (AP) group-based calibration apparatus comprising:

a memory storing instructions; and a processor coupled to the memory to execute the instructions to:

obtain path loss data of a wireless AP set, wherein the AP set comprises a plurality of Aps, and the path loss data comprises a path loss between any two of the plurality of Aps;

obtain a first calibration group based on the path loss data, wherein the first calibration group comprises a first AP and a second AP of the plurality of Aps, wherein obtaining the path loss data of the wireless AP set comprises:

obtaining first path loss data, wherein the first path loss data is a path loss value between the first AP and the second AP that falls within a preset range and that is obtained at a third sampling moment;

obtaining second path loss data, wherein the second path loss data is a path loss value between the first AP and the second AP that falls within the preset range and that is obtained at a fourth sampling moment; and obtaining path loss data between the first AP and the second AP based on the first path loss data and the second path loss data; and send first calibration information to a management AP of the first calibration group, wherein the first calibration information comprises an identifier of the first AP, an identifier of the second AP, and calibration sequence information for the management AP of the first calibration group to determine a calibration starting moment based on the calibration sequence information, and wherein the management AP of the first calibration group is an AP that performs calibration management in the first calibration group.

11. The apparatus according to claim 10, wherein the processor further executes the instructions to:
obtain load information of the first AP and load information of the second AP, wherein the load information of the first AP comprises load data of the first AP collected at a first sampling moment and load data of the first AP collected at a second sampling moment, the load information of the second AP comprises load data of the second AP collected at the first sampling moment and load data of the second AP collected at the second sampling moment, and the load data comprises at least one of a transmission rate, channel utilization, and a quantity of associated users;
obtain a first load value based on a preset first algorithm, the load data of the first AP collected at the first sampling moment, and the load data of the first AP collected at the second sampling moment;
obtain a second load value based on the preset first algorithm, the load data of the second AP collected at the first sampling moment, and the load data of the second AP collected at the second sampling moment; and
determine the management AP of the first calibration group from the first AP and the second AP based on the first load value and the second load value.

12. The apparatus according to claim 10, wherein the processor further executes the instructions to:
obtain a second calibration group and a third calibration group based on the path loss data and the AP set, wherein the second calibration group comprises a third AP and a fourth AP of the plurality of APs, and the third calibration group comprises a fifth AP and a sixth AP of the plurality of APs; and
send second calibration information to a management AP of the second calibration group and third calibration information to a management AP of the third calibration group, wherein the second calibration information comprises an identifier of the third AP and an identifier of the fourth AP, the management AP of the second calibration group is an AP that performs calibration management in the second calibration group, the third calibration information comprises an identifier of the fifth AP and an identifier of the sixth AP, and the management AP of the third calibration group is an AP that performs calibration management in the third calibration group.

13. The apparatus according to claim 12, wherein the processor further executes the instructions to:
calculate a first coupling value, a second coupling value, and a third coupling value based on the first calibration group, the second calibration group, and the third calibration group,
wherein the first coupling value is a sum of a coupling degree between the first calibration group and the second calibration group and a coupling degree between the first calibration group and the third calibration group, the second coupling value is a sum of a coupling degree between the second calibration group and the first calibration group and a coupling degree between the second calibration group and the third calibration group, and the third coupling value is a sum of a coupling degree between the third calibration group and the first calibration group and a coupling degree between the third calibration group and the second calibration group; and
obtain a calibration sequence of the calibration sequence information based on the first coupling value, the second coupling value, and the third coupling value, wherein the calibration sequence is used to represent a sequence of calibrating the first calibration group, the second calibration group, and the third calibration group.

14. The apparatus according to claim 13, wherein the first calibration information further comprises the calibration sequence, information about the management AP of the second calibration group, and information about the management AP of the third calibration group.

15. The apparatus according to claim 10, wherein the processor executes the instructions to:
use an average value of the first path loss data and the second path loss data as the path loss data between the first AP and the second AP; or
obtain the path loss data between the first AP and the second AP based on the first path loss data, the second path loss data, and a weighted averaging algorithm.

16. The apparatus according to claim 10, wherein the processor executes the instructions to:
group the first AP and the second AP into the first calibration group based on path loss data between any two of the plurality of APs and a preset second algorithm, wherein the path loss data between any two APs comprises the path loss data between the first AP and the second AP.

17. The apparatus according to claim 10, wherein the processor executes the instructions to:
receive a calibration request sent by the management AP of the first calibration group, wherein the calibration request comprises an identifier of the management AP of the first calibration group and an identifier of an AP comprised in the first calibration group;
obtain, based on the calibration request, path loss data of an AP set comprised in the first calibration group;
obtain a fourth calibration group based on the path loss data of the AP set comprised in the first calibration group, wherein an AP set comprised in the fourth calibration group is a subset of the AP set comprised in the first calibration group; and
send fourth calibration information to a management AP of the fourth calibration group, wherein the fourth calibration information comprises an identifier of an AP comprised in the fourth calibration group, and the management AP of the fourth calibration group is an AP that performs calibration management in the fourth calibration group.

18. The apparatus according to claim 10, wherein a quantity of APs in the first calibration group is less than or equal to a preset threshold, the preset threshold is a quantity of APs that a target AP is capable of managing, and the target AP is an AP that manages a minimum quantity of APs in the AP set.

* * * * *